United States Patent [19]
Stone et al.

[11] Patent Number: 6,033,299
[45] Date of Patent: Mar. 7, 2000

[54] CARCASS TRANSFER APPARATUS

[75] Inventors: David Lee Stone, Lowell, Ark.; David Lee Cullers, Stella, Mo.; William David Royall, Millers Creek, N.C.

[73] Assignee: Tyson Foods, Inc., Springdale, Ark.

[21] Appl. No.: 09/150,979

[22] Filed: Sep. 11, 1998

[51] Int. Cl.[7] ................................................. A22B 7/00
[52] U.S. Cl. ......................................... 452/182; 452/183
[58] Field of Search ................................... 452/182, 183, 452/177

[56] References Cited

U.S. PATENT DOCUMENTS

| | | | |
|---|---|---|---|
| 4,574,428 | 3/1986 | Meyn | 452/182 |
| 4,791,704 | 12/1988 | Chapman | 452/182 |
| 4,813,101 | 3/1989 | Brakels et al. | 452/182 |
| 5,344,360 | 9/1994 | Hazenbroek | 452/182 |
| 5,453,045 | 9/1995 | Hobbel et al. | 452/182 |
| 5,672,098 | 9/1997 | Veraart | 452/183 |

*Primary Examiner*—Willis Little
*Attorney, Agent, or Firm*—Fellers, Snider, Blankenship, Bailey & Tippens

[57] ABSTRACT

An apparatus for transferring carcasses from a shackle conveyor to a processing device wherein the shackle conveyor includes a plurality of shackles for continuously conveying the carcasses and the processing device includes a plurality of modules for continuously carrying the carcasses through the processing device. The inventive apparatus comprises a rotatable structure preferably having notches for receiving and retaining the legs of the carcasses. The rotatable structure is operable such that, as the rotatable structure rotates, the legs of the carcasses are received from the shackles by the rotatable structure and the rotatable structure then delivers the carcasses to the carrier modules.

15 Claims, 10 Drawing Sheets

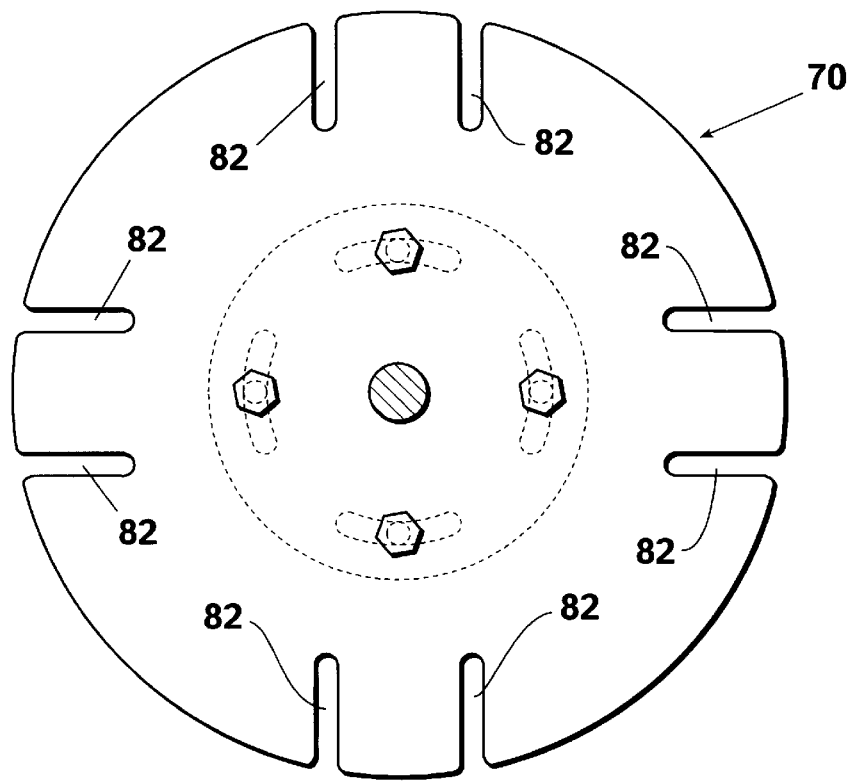
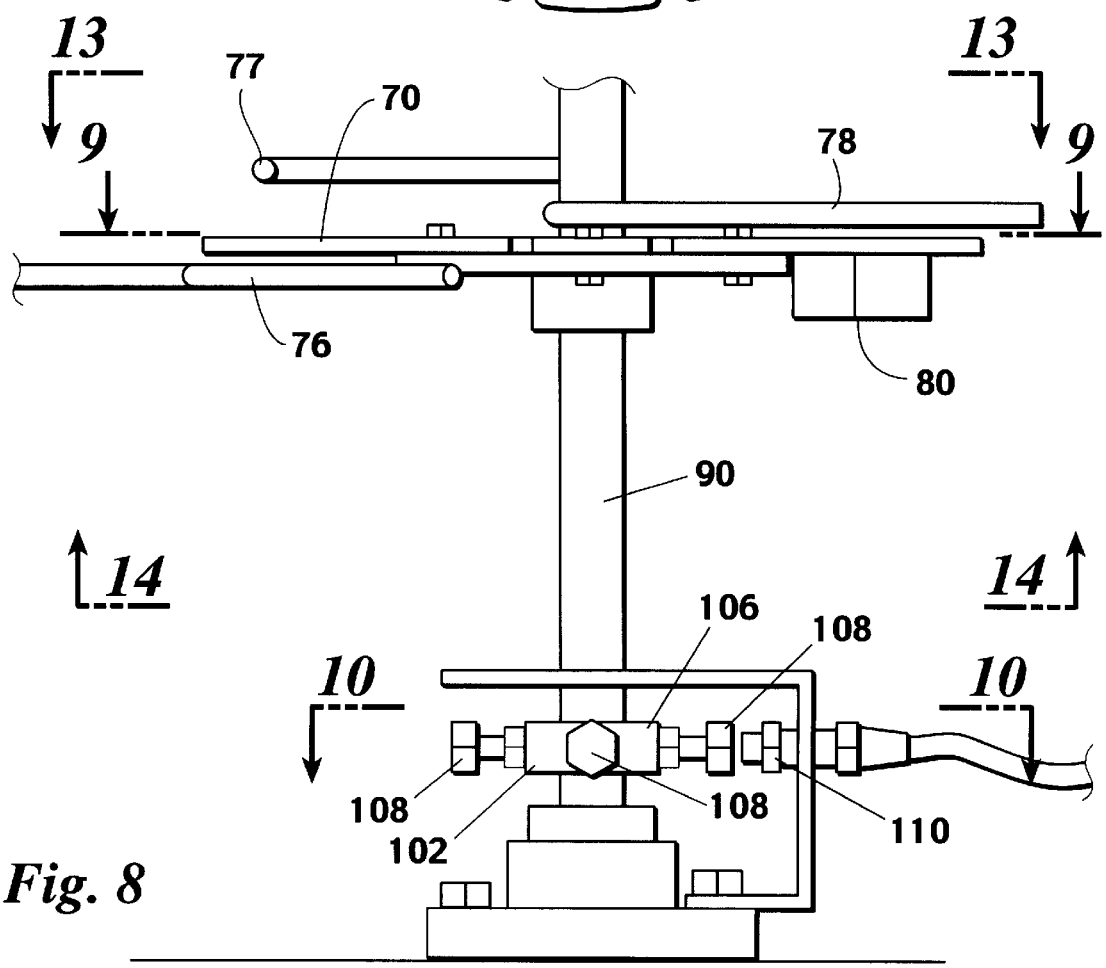

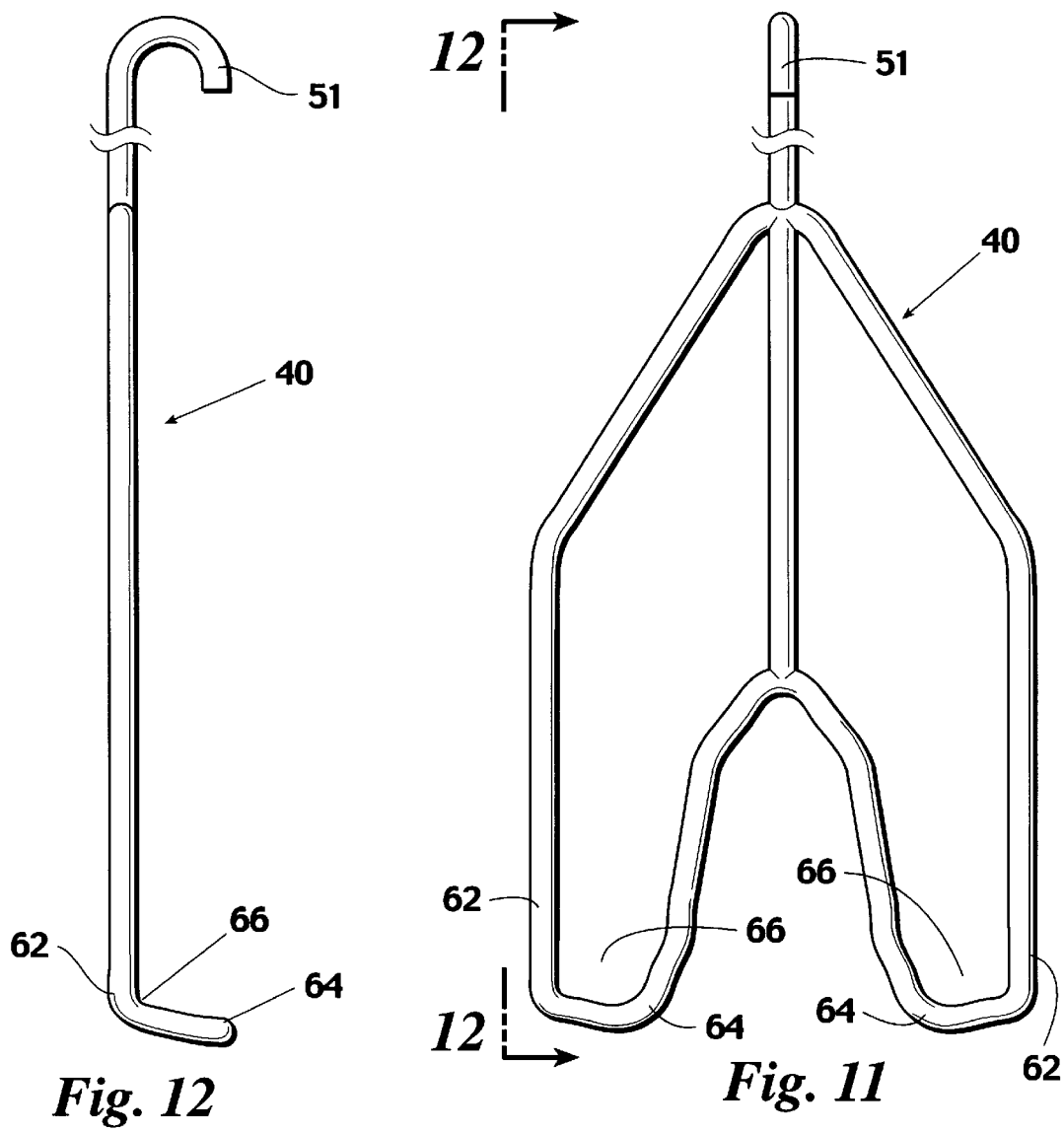
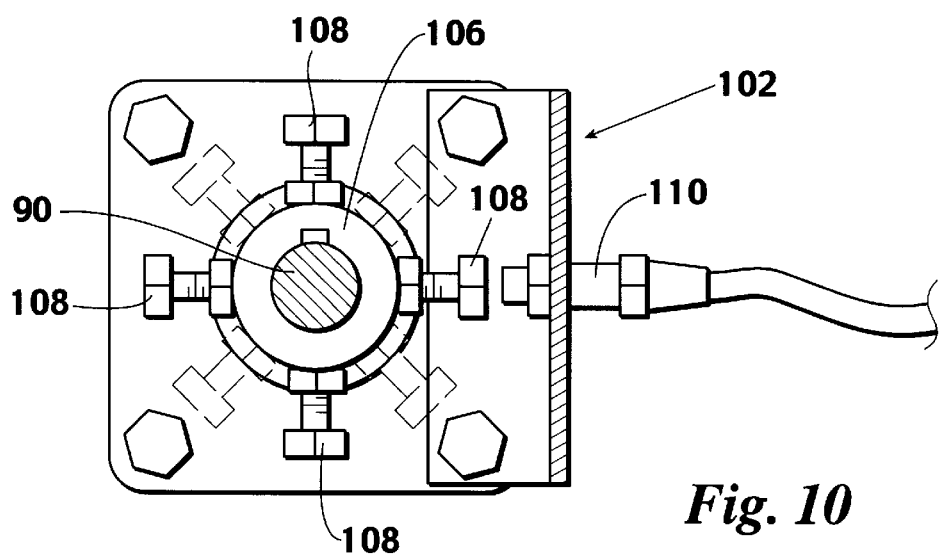
Fig. 12
Fig. 11
Fig. 10

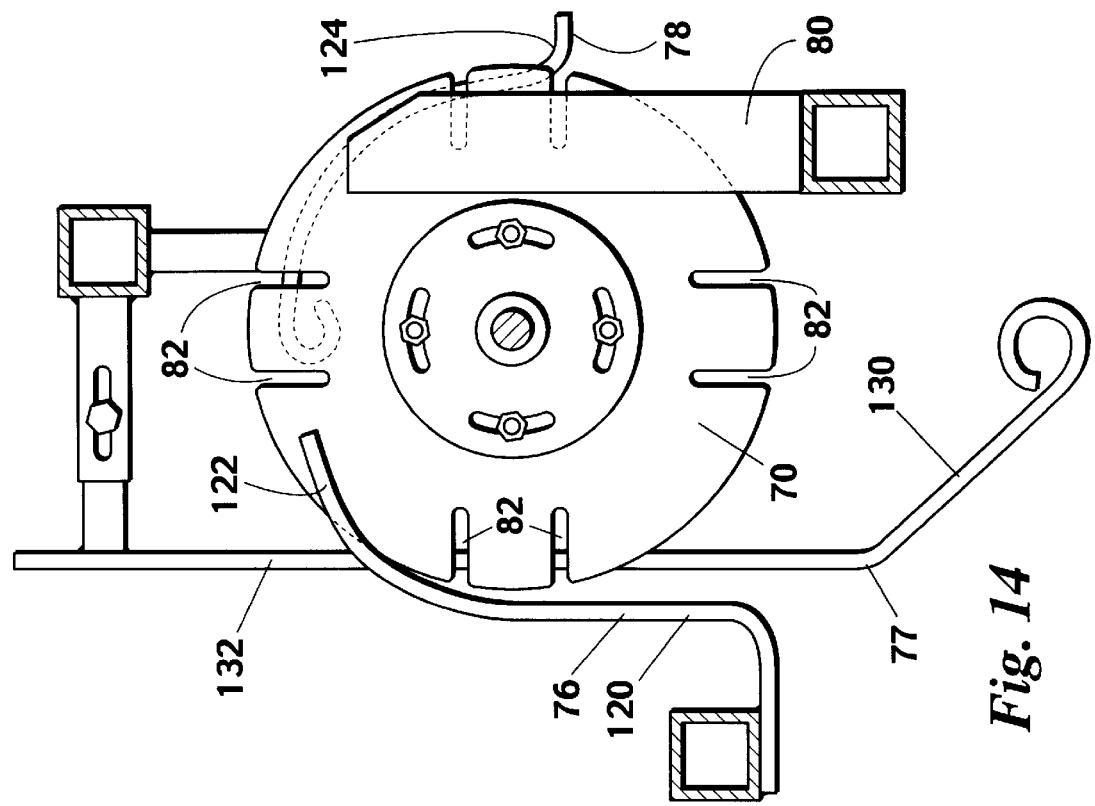
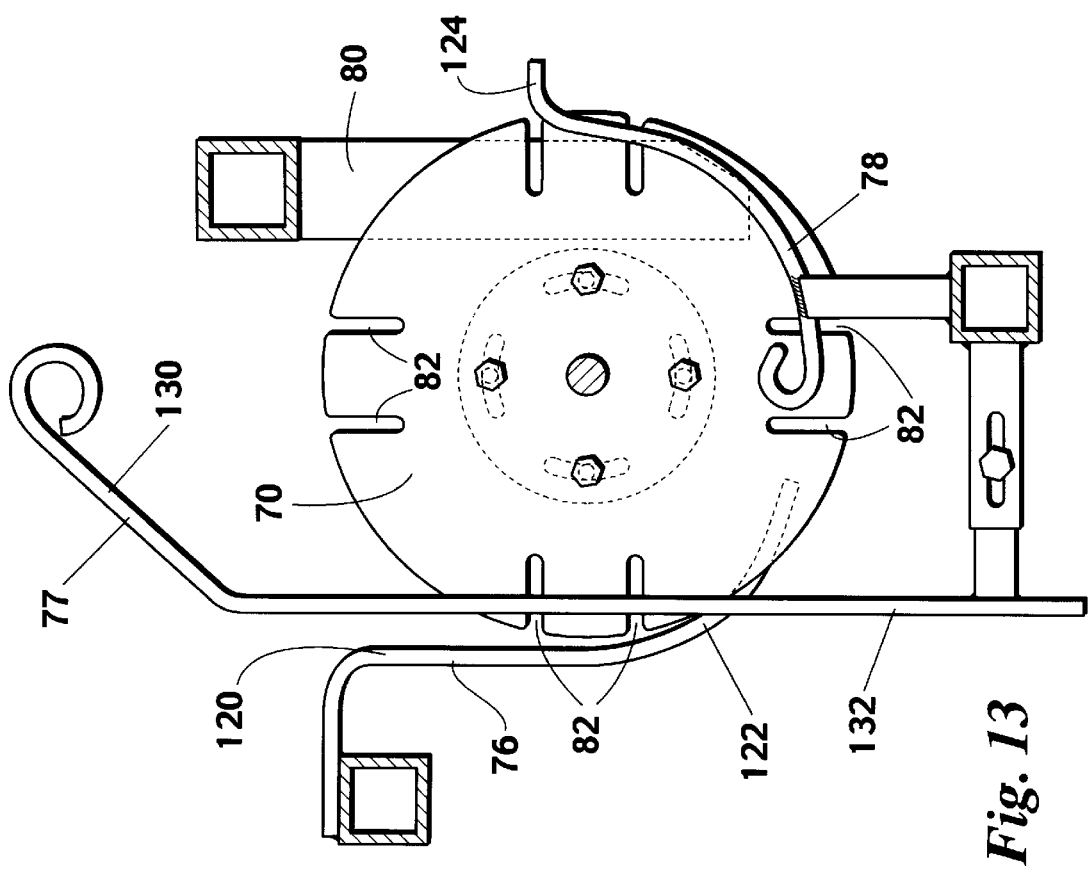

6,033,299

CARCASS TRANSFER APPARATUS

FIELD OF THE INVENTION

The present invention relates to apparatuses for transferring carcasses from shackle-type conveyors. More particularly, but not by way of limitation, the present invention relates to apparatuses for transferring carcasses from shackle-type conveyors to multi-cut-type processing machines.

BACKGROUND OF THE INVENTION

Multi-cut machines for processing poultry carcasses are well known in the art. A multi-cut machine, such as the well known machine manufactured by Johnson Food Equipment, will typically comprise: a continuous series of carrier modules for holding whole, eviscerated poultry carcasses and carrying the carcasses through the machine; a drive assembly for continuously driving the carrier module train; a plurality of stationary cutting blades sequentially positioned for performing various cutting operations; and a variety of structures and mechanisms for pivoting the carrier modules and manipulating the carcasses such that the carcasses are properly oriented for the various cutting operations.

A typical carrier module 2 for a Johnson multi-cut machine is depicted in FIGS. 3 and 4. Carrier module 2 comprises: a rigid back plate 4; a pair of stirrup structures 6, projecting upwardly and forwardly from back plate 4, for receiving and retaining the hocks of the carcass legs; a retracting clamp 8, provided at the base of plate 4, for clamping the neck portion of the carcass; a pair of forwardly projecting wing clamping bars 10 positioned near the base of plate 4; a pair of reciprocatable wing clamps 12 operably extending through plate 4; and various posts and other structures for holding and manipulating the poultry carcass. As each carcass is carried through the machine, it encounters the various stationary cutting blades and is pivoted and manipulated, as necessary, to perform various cutting operations. The cutting operations typically include: removing the wings from the carcass; removing the lower half of the carcass; performing a middle cut through the upper half of the carcass; and/or separating the thighs from the drums.

A need presently exists for a system for continuously and automatically transferring carcasses from shackle conveyors to multi-cut machines or to other processing devices. At present, such transfers are performed by hand. In addition to being labor intensive and costly, such manual transfer operations are typically very tedious.

SUMMARY OF THE INVENTION

The present invention provides an apparatus and system which satisfy the needs and alleviate the problems mentioned above. The inventive apparatus is operable for transferring carcasses from a shackle conveyor to a processing device. As previously mentioned, shackle conveyors typically include a plurality of shackles for continuously carrying carcasses. Multi-cut machines and other processing devices commonly include a plurality of modules for continuously carrying carcasses through the processing device. The inventive apparatus comprises: delivery means for continuously delivering the carcasses from the shackles to the modules; first transfer means for continuously transferring the carcasses from the shackles to the delivery means; and second transfer means for continuously transferring the carcasses from the delivery means to the modules.

In another aspect, the present invention provides an apparatus for transferring carcasses from a shackle conveyor to a processing device wherein: the carcasses have legs; the shackle conveyor includes a plurality of shackles for continuously conveying the carcasses; and the processing device includes a plurality of modules for continuously carrying the carcasses through the processing device. The inventive apparatus comprises a rotatable structure for receiving and retaining the legs of the carcasses. Moreover, the rotatable structure is operable such that, as the rotatable structure rotates, the legs are received by the rotatable structure from the shackles and the rotatable structure then delivers the carcasses to the modules.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 8 provides a front view of the lower portion of inventive transfer apparatus 20.

FIG. 9 provides a top view, as seen from perspective 9—9 shown in FIG. 8, of a rotatable transfer element 70 employed in inventive apparatus 20.

FIG. 10 provides a top view, as seen from perspective 10—10 shown in FIG. 8, of a proximity meter 102 employed in inventive apparatus 20.

FIG. 11 provides a front view of an inventive shackle 40 employed in inventive apparatus 20.

FIG. 12 provides a side view of inventive shackle 40.

FIG. 13 provides a cutaway top view of inventive apparatus 20 as seen from perspective 13—13 shown in FIG. 8.

FIG. 14 provides a cutaway bottom view of inventive apparatus 20 as seen from perspective 14—14 shown in FIG. 8.

DESCRIPTION OF THE PREFERRED EMBODIMENTS

Figure 1:
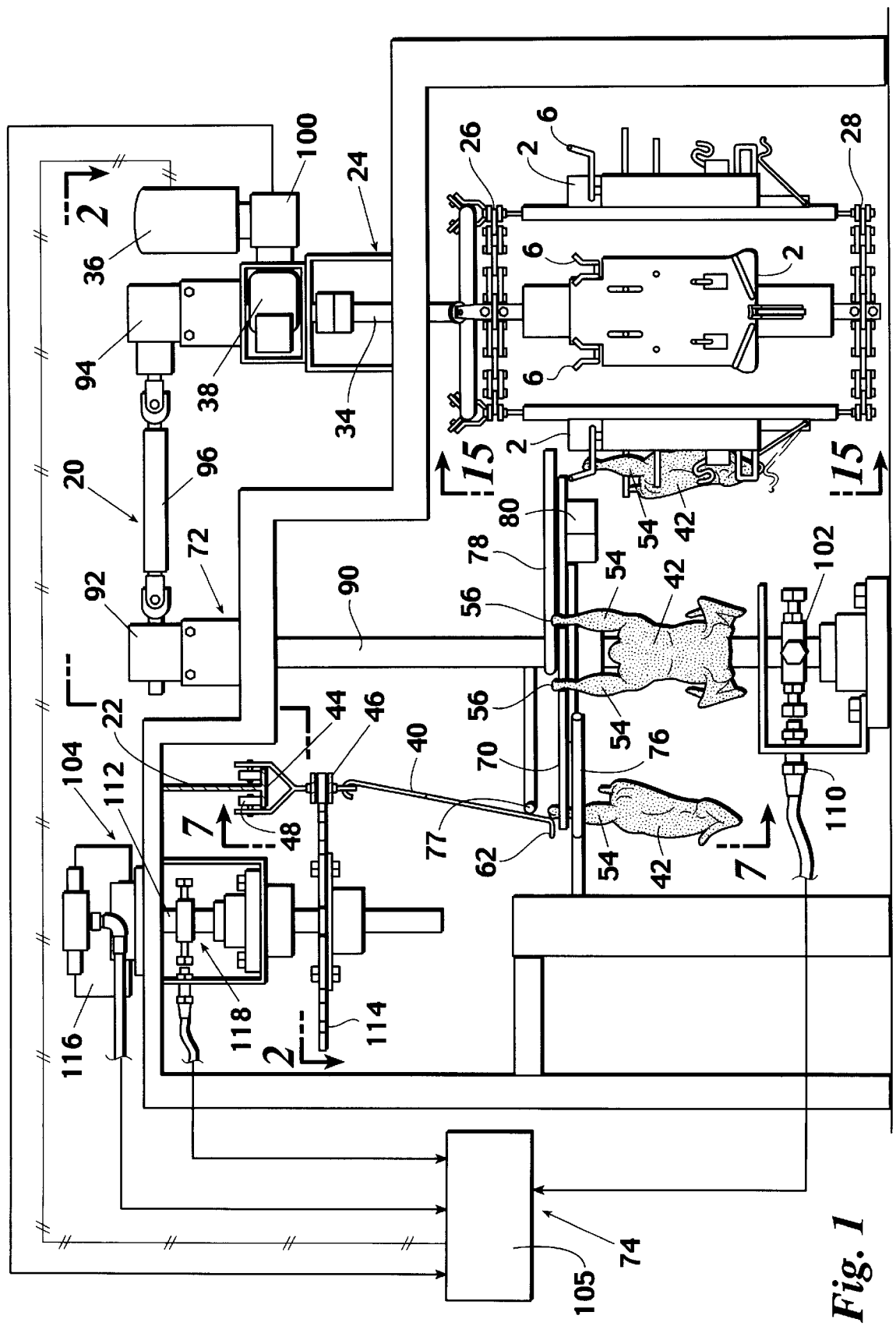
FIG. 1 illustrates an embodiment 20 of the inventive transfer apparatus as employed for transferring carcasses 42 from a shackle conveyor 22 to a processing machine 24.
Figure 2:
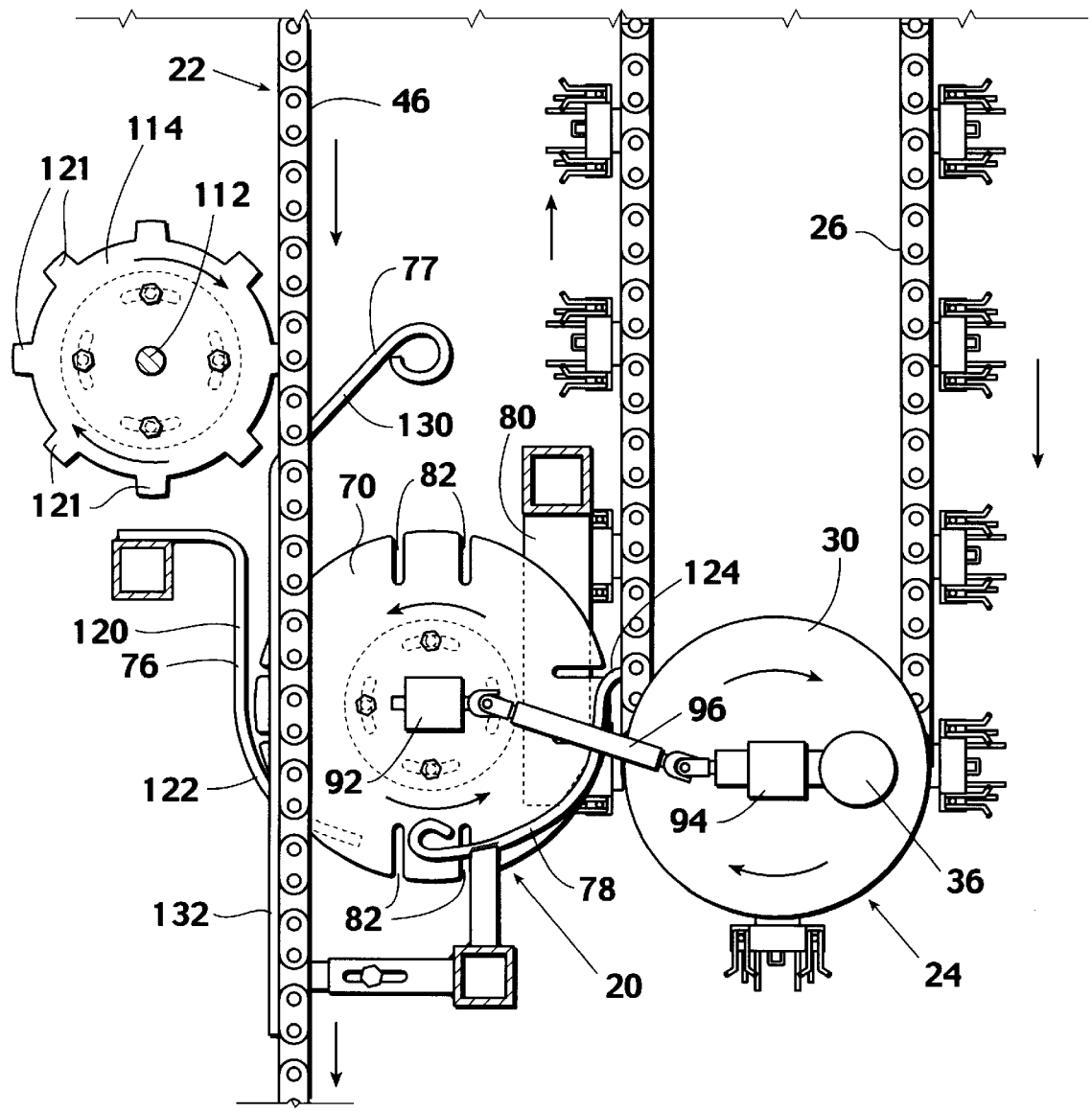
FIG. 2 provides a top view of inventive apparatus 20 as seen from perspective 2—2 shown in FIG. 1.
Figures 3, 4:
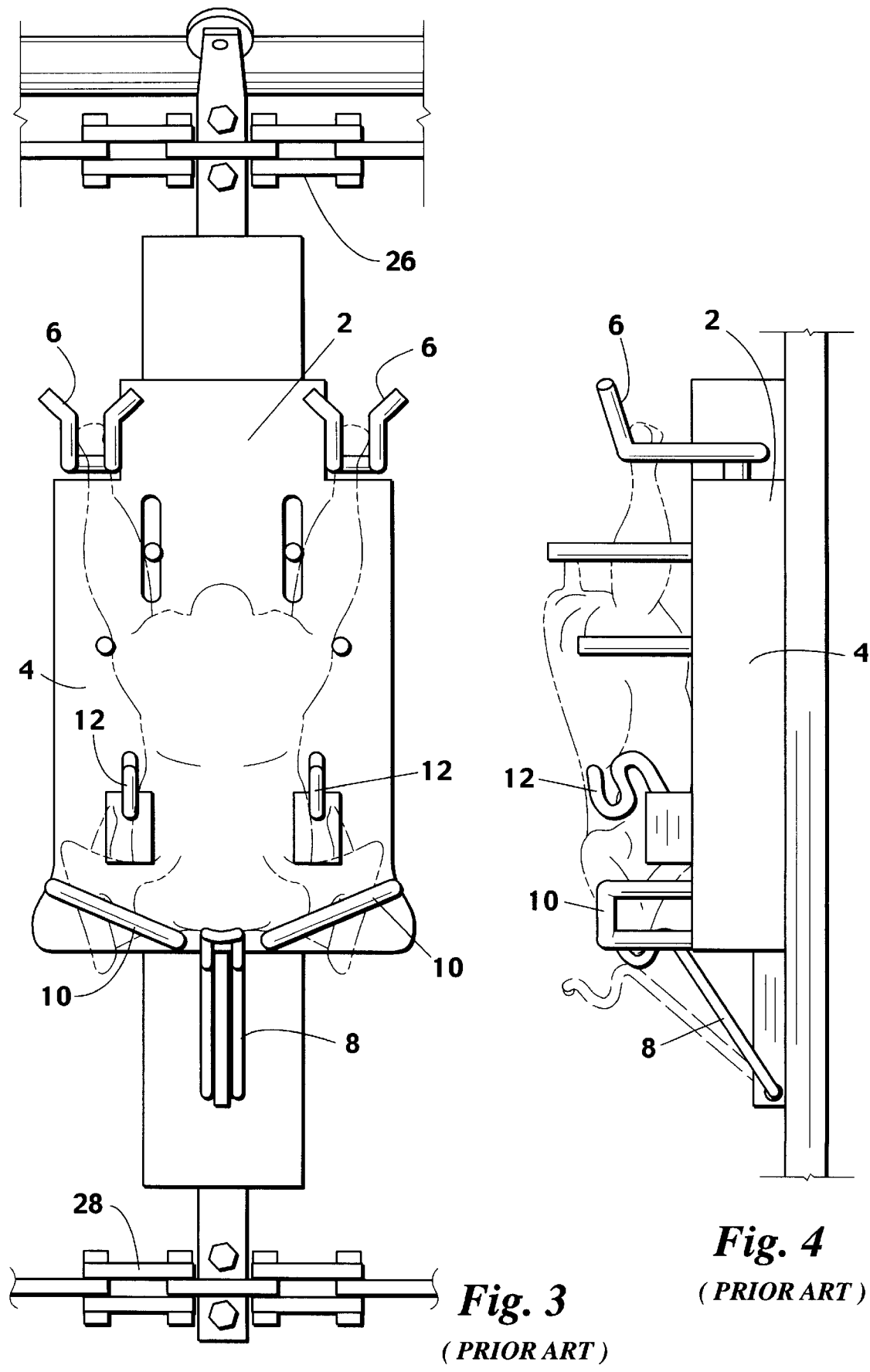
FIG. 3 provides a front view of a typical prior art carrier module 2 employed in a multi-cut-type machine.
FIG. 4 provides a side view of carrier module 2.
Figure 6:
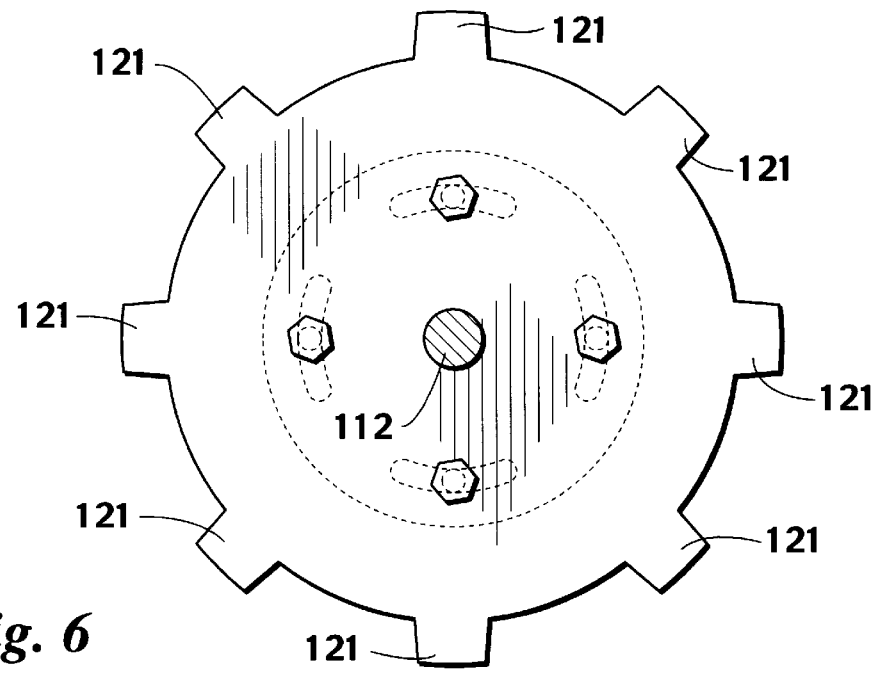
FIG. 6 provides a top view of a sprocket wheel 114 employed in shackle monitoring assembly 104.
Figure 5:
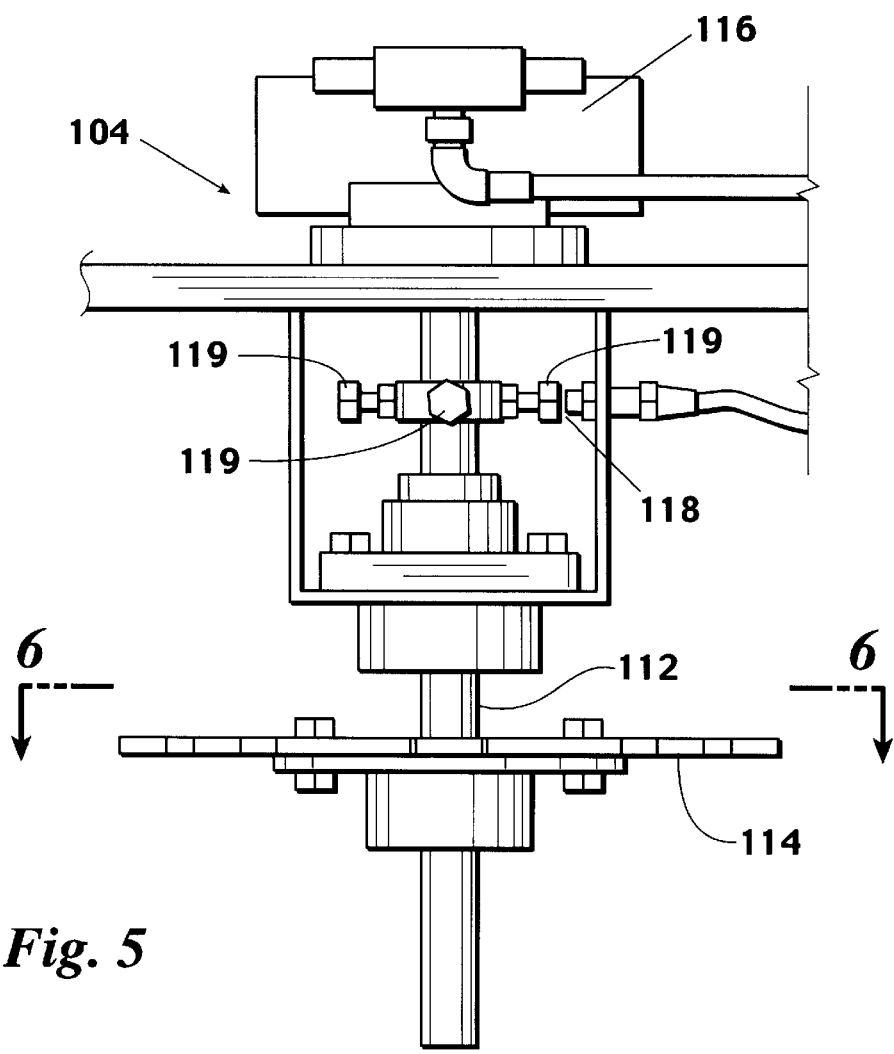
FIG. 5 illustrates an embodiment 104 of a shackle monitoring assembly employed in inventive transfer apparatus 20.
Figure 7:
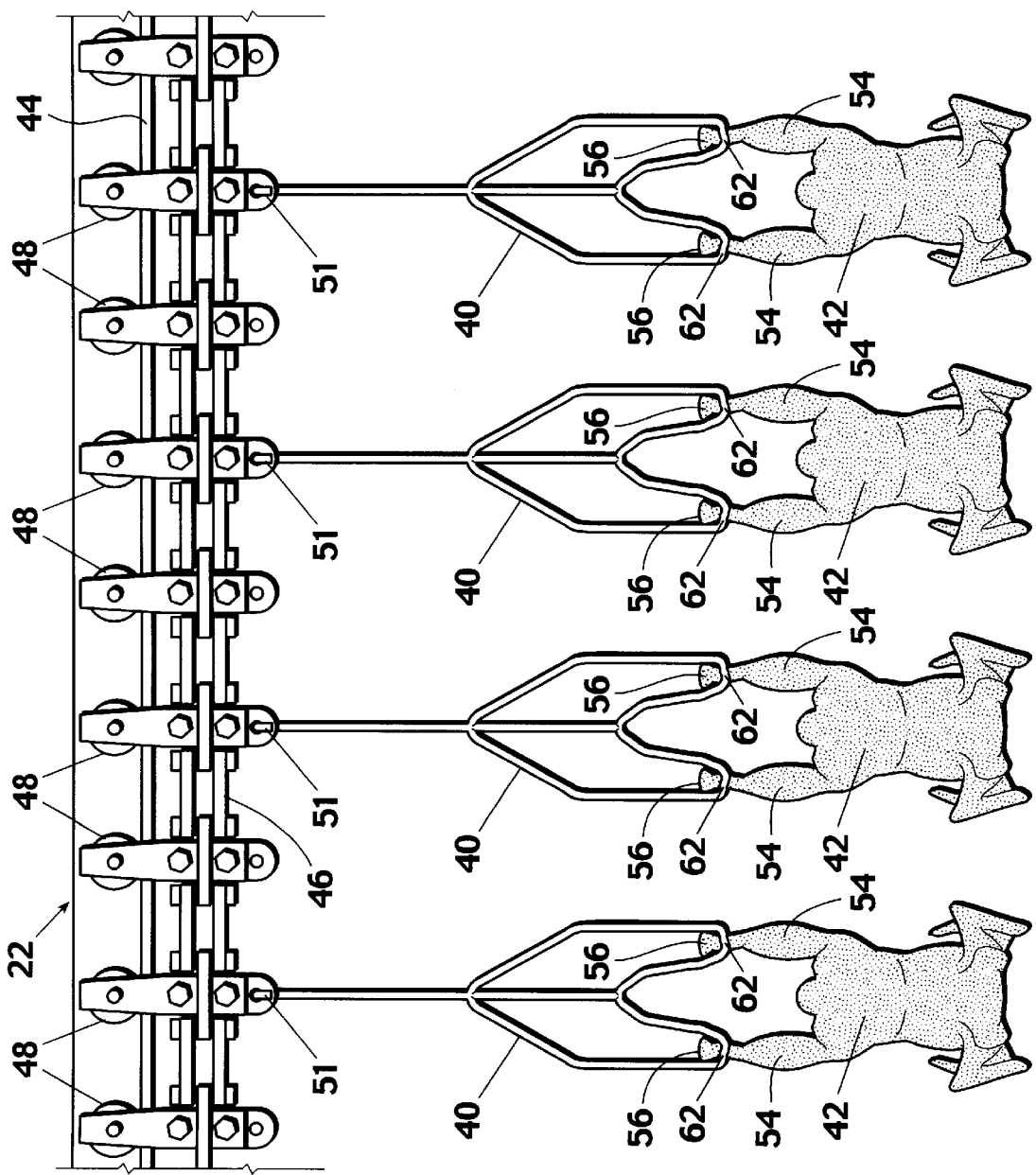
FIG. 7 depicts shackle conveyor 22 as seen from perspective 7—7 shown in FIG. 1.
Figure 15:
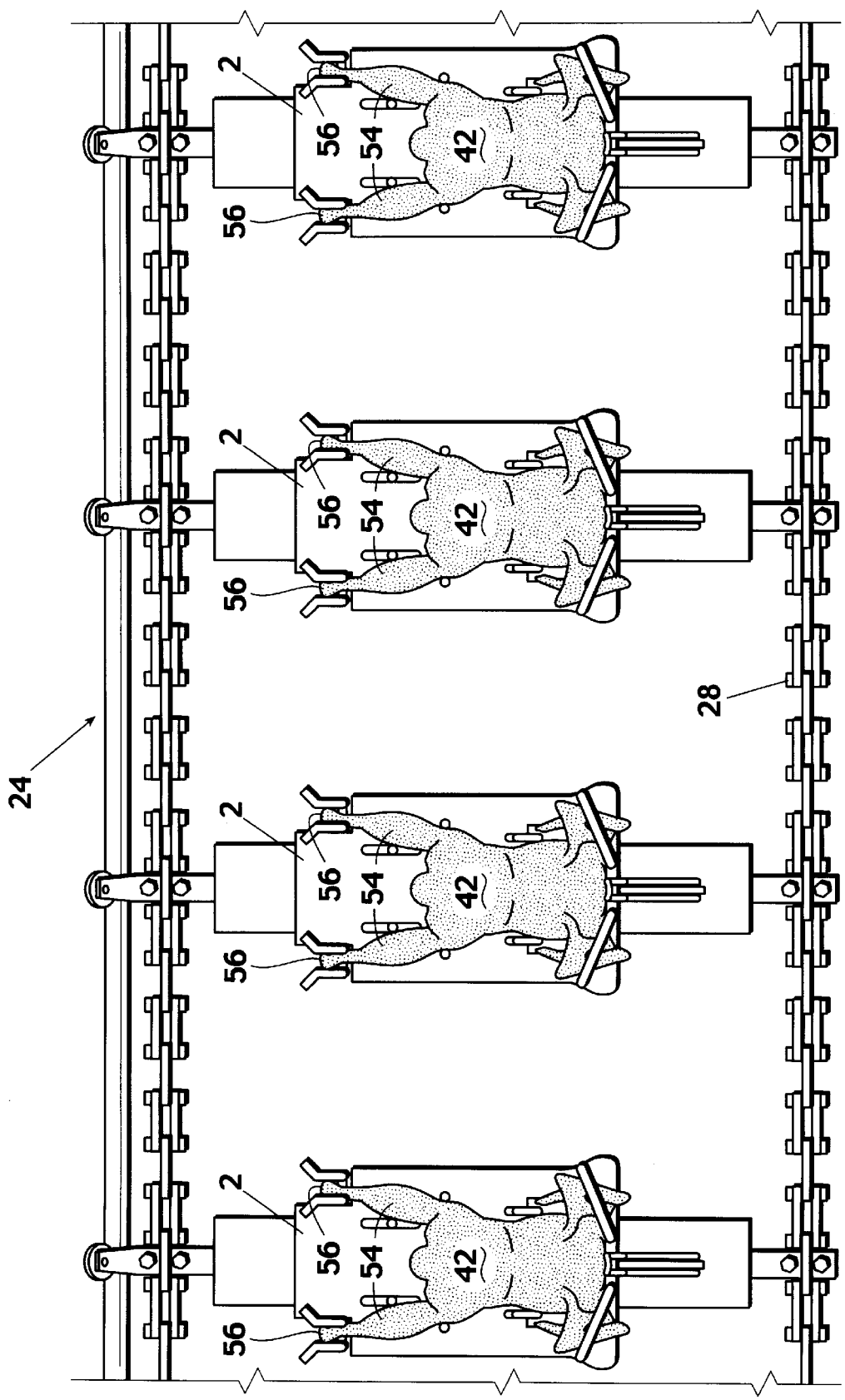
FIG. 15 depicts processing machine 24 as seen from perspective 15—15 shown in FIG. 1.

An embodiment 20 of the inventive transfer apparatus is depicted in FIGS. 1 and 2. Also shown in FIGS. 1 and 2 are: a shackle conveyor system 22, for continuously carrying whole or partial carcasses (e.g., eviscerated poultry carcasses) from upstream processing units, and a processing machine 24. The particular processing machine 24 shown is a multi-cut-type machine comprising: a continuous series of carrier modules 2 linked and carried by upper and lower conveyor chains 26 and 28; an upper drive wheel 30 and a substantially identical lower drive wheel (not shown) for driving conveyor chains 26 and 28; a drive shaft 34 operably extending through the drive wheels; a drive motor 36; and a gear box 38 operably linking motor 36 with drive shaft 34. Drive motor 36 can be an electric motor, a hydraulic motor, a combustion powered motor or generally any other type of motor known in the art.

Shackle conveyor 22 will typically comprise: a continuous series of shackles 40 which carry carcasses 42; a conveyor rail 44; a conveyor chain 46 from which shackles 40 are hung; and a series of roller elements 48 which carry chain 46 on conveyor rail 44.

Figures 16, 17:
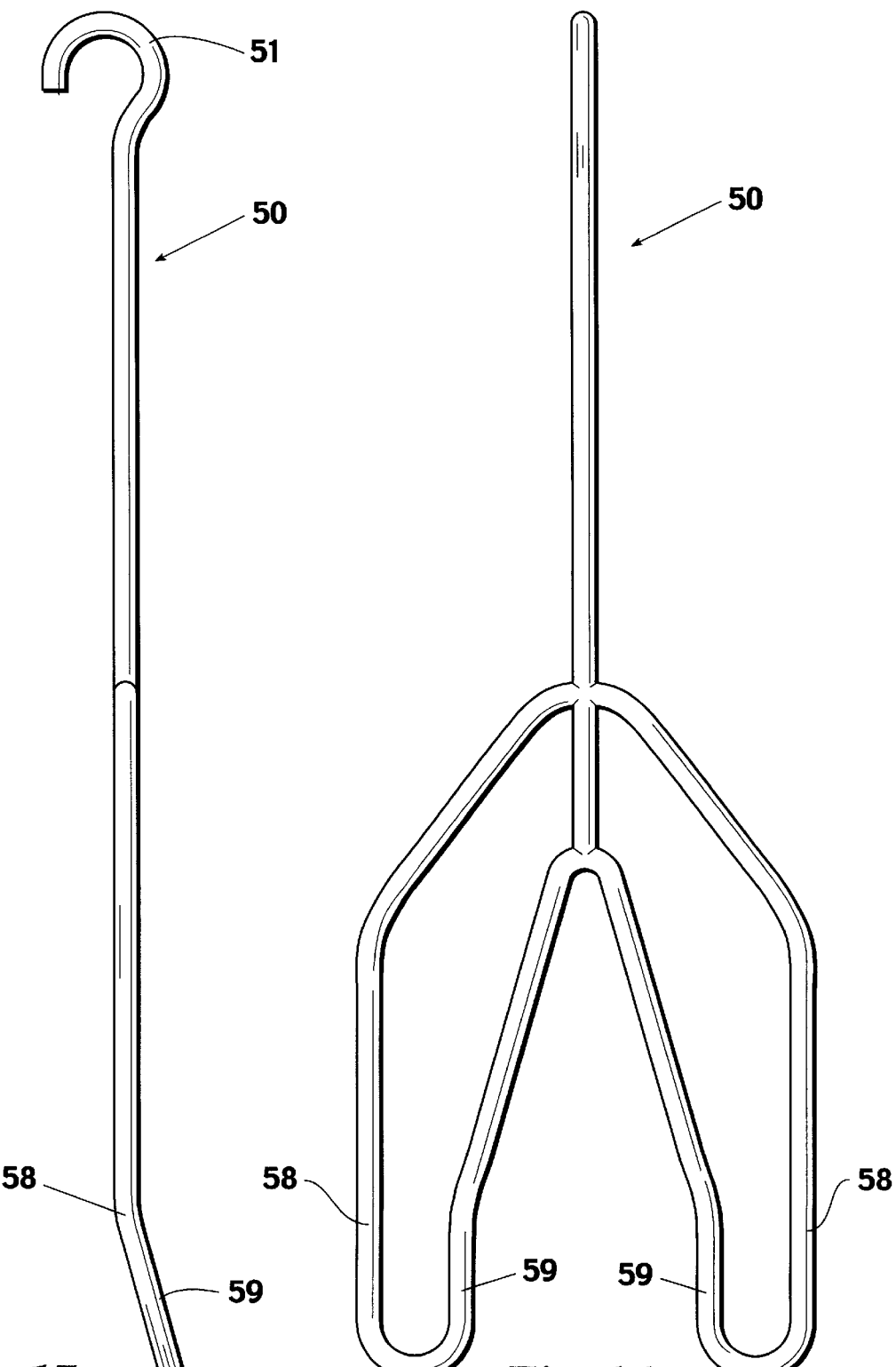
FIG. 16 provides a front view of a prior art shackle 50.
FIG. 17 provides a side view of prior art shackle 50.

Certain inventive modifications are preferably made to shackles 40 for use in the present invention. A typical, prior art poultry shackle 50 is depicted in FIGS. 16 and 17. The preferred, modified shackle 40 is depicted in FIGS. 11 and 12. Each of shackles 50 and 40 will typically have a hook 51 at the upper end thereof for hanging the shackle from conveyor chain 46. Each of shackles 50 and 40 also has a pair of stirrup structures 58 or 62 provided at the lower end thereof for receiving the legs 54 of carcasses 42. Stirrup structures 58 or 62 retain the hocks 56 at the distal end of legs 54 such that carcasses 42 will hang from shackles 50 and 40.

The stirrup structures 62 of the preferred, modified, inventive shackle 40 differ from stirrup structures 58 of common shackle 50. Comparing shackles 50 and 40, the stirrup structures 58 of the common shackle 50 are relatively narrow and the lower end portions 59 of stirrups 58 are close to vertical. Thus, when removing the legs 54 of a poultry carcass from common shackle 50, the carcass must first be lifted a sufficient distance (typically at least 1–1½ inches) to thereby position the leg hocks 56 at locations of sufficient interior width to allow the hocks to be delivered out of the back of shackle 50.

In contrast, the forward angle of the lower stirrup portions 64 of inventive shackle 40 is much greater than that of shackle 50, so that lower portions 64 preferably are close to horizontal. Additionally, the interior width of modified stirrups 62 has been significantly increased at the rear opening of angled lower portion 64. As a result, while the interior widths of lower stirrup portions 64 are sufficiently narrow to retain and hold the hocks 56 of the carcass, hocks 56 can be removed from new stirrups 62 by simply pushing or pulling hocks 56 through rear openings 66. Thus, legs 54 can be removed from modified stirrups 62 substantially without lifting carcass 42.

Inventive transfer apparatus 20 preferably comprises: a rotatably mounted transfer element 70; stationary (but optionally adjustable) guide elements 76 and 77 for guiding carcasses 42 from shackles 40 to rotatable transfer element 70; stationary (but optionally adjustable) guide elements 78 and 80 for guiding carcasses 42 from rotatable transfer element 70 to carrier modules 2; a drive system 72 for driving transfer element 70; and a synchronization system 74 for synchronizing processing machine 24 and inventive transfer apparatus 20 with shackle conveyor 22.

As will be apparent to those skilled in the art, rotatably mounted transfer element 70 can be substantially any structure capable of receiving, holding, and delivering carcasses 42 in the manner generally described herein. Rotatably mounted transfer element 70 is most preferably a flat and substantially circular, or at least semicircular, plate-type structure having at least one pair of notches 82 formed in, or otherwise provided at, the perimeter of the plate. The widths of notches 82 are preferably less than those of hocks 56 but are greater than the widths of the portions of legs 54 beneath hocks 56. Thus, legs 54 can be delivered into and out of the outer ends of notches 82 but will not fall through the bottoms of notches 82. Transfer element 70 preferably includes a plurality of pairs of notches 82 (most preferably four pairs) spaced such that the pairs can be synchronized with shackle conveyor 22 and processing machine 24.

As will be apparent, various types of drive arrangements can be used for driving rotatable transfer element 70. For example, transfer element 70 can be directly driven or can be driven by, or with, either the processing machine drive system or the shackle conveyor drive system. As will also be apparent to those skilled in the art, regardless of the particular drive option employed, appropriate synchronization systems can be readily adapted for synchronizing inventive transfer apparatus 20 and processing machine 24 with shackle conveyor 22.

In a presently preferred embodiment, inventive transfer apparatus 20 is slaved from, and therefore directly synchronized with, the drive system of processing machine 24. In this particular embodiment, the drive system 72 of inventive apparatus 20 preferably comprises: a vertical drive shaft 90 extending through transfer element 70; a gear box 92 provided at the upper end of drive shaft 90; a gear box 94 provided at the upper end of the vertical drive shaft 34 of processing machine 24; and a universal joint 96 extending between gear boxes 92 and 94.

While various options will be apparent to those skilled in the art, the synchronization system employed in inventive transfer apparatus 20 will preferably comprise: a tachometer 100 for continuously determining and monitoring the speed of the drive motor 36 and/or drive shaft 34 of processing machine 24; a proximity meter 102 for continuously determining and monitoring the rotational position of transfer element 70; a shackle monitoring assembly 104 for continuously determining and monitoring the speed and position of shackles 40; and a controller 105 (e.g., preferably a computer processing unit). Controller 105 preferably controls and adjusts the speed of drive motor 36 as necessary to cause the speed and position of transfer element 70 to coincide with the speed and position of shackles 40. As depicted in FIGS. 1, 8, and 10, proximity meter 102 comprises: a collar 106 secured around the vertical drive shaft 90 of inventive apparatus 20; a plurality of bolts or other metallic members 108 projecting radially from collar 106 and arranged in a manner corresponding to the positions of the pairs of notches 82 provided in transfer element 70; and a magnetic detector 110 which detects the passage of bolts 108 as bolts 108 rotate with drive shaft 90.

It will be apparent to those skilled in the art that various devices and systems could be used for continuously determining and monitoring the speed and position of shackles 40. As depicted in FIGS. 1, 2, 5, and 6, a presently preferred embodiment of shackle monitoring assembly 104 comprises: an elongate, vertical, rotatably mounted shaft 112; a sprocket wheel 114 which is secured on vertical shaft 112 and which intermeshes with, and is driven by, shackle conveyor chain 46; a tachometer 116 for continuously determining and monitoring the rotational speed of vertical shaft 112; and a proximity meter 118 for continuously detecting and monitoring the rotational position of sprocket wheel 114. Proximity meter 118 can be of the same type as proximity meter 102 such that the projecting bolts 119 of meter 118 correspond to the position of sprocket wheel 114. The teeth 121 of sprocket wheel 114 are preferably positioned to correspond to the spacing of shackles 40 such that the position of sprocket wheel 114 and the rotational speed of vertical shaft 112 directly correspond to the speed and position of shackles 40.

As seen in FIGS. 1 and 2, the rotatable transfer element 70 of inventive apparatus 20 is preferably positioned such that the outer portion of transfer element 70 extends below the stirrups 62 of shackles 40 and above the stirrups 6 of carrier modules 2. The outer portion of transfer element 70 moves in the same direction as, and is synchronized with, shackle conveyor 22 such that, as each shackle 40 approaches rotating transfer element 70, lower guide element 76 directs the legs 54 of the carcass 42 against the perimeter of transfer element 70 and into transfer element notches 82.

Lower guide element 76 is preferably a guide rod, a guide block, or similar structure having a relatively straight initial portion 120, which converges with the outer edge of drive element 70, and a curved end portion 122 which curls beneath transfer element 70. The curved end portion 122 of guide element 76 operates to push the legs 54 of the carcass into transfer element notches 82 and out of the back openings 66 of shackle stirrups 62.

Upper guide element 77 is preferably a guide rod, a guide block, or similar structure having an outwardly angled initial segment 130 followed by a straight segment 132 which preferably runs substantially parallel to the initial straight segment 120 of lower guide element 76. As illustrated in FIG. 1, shackles 40 contact upper guide element 77 in a manner which directs carcasses 42 into contact with lower guide element 76. Further, as also illustrated in FIG. 1, the latter segment 132 of upper guide element 77 holds shackle 40 at a slight angle such that the lower portions 64 of stirrups 62 are substantially horizontal. Thus, lower guide element 76 can easily push legs 54 out of stirrups 62 without lifting carcass 42.

The upper guide element 78 used for guiding carcasses 42 into carrier modules 2 is preferably a guide bar, a guide block, or similar structure positioned above transfer element 70. Guide element 78 curves inwardly over the perimeter of transfer element 70 and has an outwardly curved end portion 124. Lower guide element 80 is preferably a guide block, a guide bar, or similar structure positioned below transfer element 70. Guide element 80 has an outer edge and an inwardly angled end portion 136 which extend under the outer portion of transfer element 70. The outer portion of transfer element 70 rotates in the same direction as, and is synchronized with, carrier modules 2 such that, as carcasses 42 rotate toward carrier modules 2, the carcasses engage guide elements 76 and 78. Guide elements 76 and 78 force legs 54 out of transfer element notches 82 and into the stirrups 6 of a carrier module 2. As legs 54 are forced out of notches 82, the hocks 56 of legs 54 drop into and are retained by carrier stirrups 6.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for transferring carcasses from a conveyor to a processing device, said carcasses having legs with hocks at the distal ends thereof, and said processing device including a plurality of modules for continuously carrying said carcasses through said processing device, said apparatus comprising:

a plurality of shackles hanging from said conveyor, each said shackle having an upper end portion by which said shackle hangs from said conveyor and a lower end portion, said lower end portion including a pair of stirrups for receiving said legs and holding said legs by said hocks;

delivery means for continuously delivering said carcasses from said shackles to said modules;

first transfer means for continuously transferring said carcasses from said shackles to said delivery means; and second transfer means for continuously transferring said carcasses from said delivery means to said modules, wherein said shackles and said stirrups are configured and said first transfer means is operable such that said first transfer means transfers said carcasses from said shackles to said delivery means substantially without lifting said carcasses relative to said shackles.

2. The apparatus of claim 1 wherein said processing device is a multi-cut-type processing machine.

3. The apparatus of claim 1 wherein said delivery means includes first holding means for holding said legs and wherein said first transfer means is operable for continuously removing said legs from said shackles and placing said legs into said first holding means substantially without lifting said carcasses relative to said shackles.

4. The apparatus of claim 1 wherein, when said shackles hang vertically from said conveyor, said stirrups are at least close to horizontal.

5. The apparatus of claim 1 wherein:

said delivery means includes first holding means for holding said legs;

said modules include second holding means for holding said legs; and said second transfer means is operable for continuously removing said legs from said first holding means and placing said legs in said second holding means.

6. The apparatus of claim 5 wherein:

said second transfer means is operable for placing said legs in said second holding means such that said hocks drop into and are retained by said second holding means.

7. The apparatus of claim 1 wherein said delivery means comprises a rotatable structure having at least a pair of notches provided therein for receiving and holding said legs.

8. The apparatus of claim 7 wherein said rotatable structure is a substantially circular plate having an outer perimeter and wherein said pair of notches are provided at said outer perimeter.

9. The apparatus of claim 7 wherein:

said first transfer means comprises stationary guide structures for pivoting said shackles at said upper end portions thereof and guiding said legs out of said stirrups and into said pair of notches substantially without lifting said carcasses relative to said stirrups and said second transfer means comprises at least one stationary guide structure for guiding said legs out of said pair of notches.

10. The apparatus of claim 1 further comprising synchronizing means for synchronizing said delivery means, said processing device, and said shackle conveyor.

11. The apparatus of claim 1 further comprising rotating means for rotating said delivery means.

12. The apparatus of claim 1 further comprising:

means for determining the speed of said conveyor;

means for determining the location of said shackles; and means for determining the position of said delivery means.

13. The apparatus of claim 12 further comprising:

drive means for rotating said delivery means and driving said processing device and means for controlling the speed of said drive means based upon the speed of said conveyor, the location of said shackles, and the position of said delivery means.

14. The apparatus of claim 1 wherein said stirrups are configured and said first transfer means is operable such that, as said first transfer means transfers said carcasses from said shackles to said delivery means, said first transfer means will pivot said shackles at said upper end portions and retain said shackles at an angle such that said stirrups are at least substantially horizontal.

15. The apparatus of claim 14 wherein said first transfer means comprises a first stationary guide structure positioned above said delivery means and a second stationary guide structure positioned below said delivery means.

* * * * *